(12) United States Patent
Song et al.

(10) Patent No.: US 7,617,610 B2
(45) Date of Patent: Nov. 17, 2009

(54) METHOD OF MEASURING A CLEARANCE OF A HUB BEARING FOR VEHICLES

(75) Inventors: Young Su Song, Chungcheongbuk-do (KR); Suk Yong Bae, Gyeongsangbuk-do (KR)

(73) Assignee: Il Jin Global Co., Ltd, Seoul (KR)

( * ) Notice: Subject to any disclaimer, the term of this patent is extended or adjusted under 35 U.S.C. 154(b) by 0 days.

(21) Appl. No.: 12/298,119

(22) PCT Filed: May 29, 2007

(86) PCT No.: PCT/KR2007/002605

§ 371 (c)(1), (2), (4) Date: Oct. 22, 2008

(87) PCT Pub. No.: WO2007/139339

PCT Pub. Date: Dec. 6, 2007

(65) Prior Publication Data

US 2009/0113735 A1    May 7, 2009

(30) Foreign Application Priority Data

May 29, 2006   (KR) ..................... 10-2006-0048159

(51) Int. Cl.
 *G01B 5/14* (2006.01)
(52) U.S. Cl. .............................. 33/517; 33/549; 33/600; 29/898.09; 73/862.49
(58) Field of Classification Search .................. 33/517, 33/203, 203.18, 203.19, 203.2, 203.21, 549, 33/600, 701, 832, 833; 29/270–273, 898.09; 73/862.49, 862.541
See application file for complete search history.

(56) References Cited

U.S. PATENT DOCUMENTS

| | | | | |
|---|---|---|---|---|
| 4,165,636 | A | * | 8/1979 | Bartholet ................ 73/862.541 |
| 5,224,273 | A | * | 7/1993 | Dellas ......................... 33/517 |
| 5,497,559 | A | | 3/1996 | Okumura et al. |
| 5,557,854 | A | | 9/1996 | Fujioka |
| 5,597,965 | A | | 1/1997 | Endo et al. |
| 5,718,049 | A | * | 2/1998 | Ohtsuki et al. ........... 29/898.09 |
| 6,070,325 | A | * | 6/2000 | Miyata et al. ............ 29/898.09 |
| 6,446,339 | B2 | * | 9/2002 | Takamizawa et al. .... 29/898.09 |
| 6,460,423 | B1 | * | 10/2002 | Keller et al. ............. 73/862.49 |
| 7,251,892 | B2 | * | 8/2007 | Strait ...................... 29/898.09 |

* cited by examiner

*Primary Examiner*—G. Bradley Bennett
*Assistant Examiner*—Tania C Courson
(74) *Attorney, Agent, or Firm*—Michael Best & Friedrich

(57) ABSTRACT

The present invention relates to a method of measuring a clearance of a hub bearing for vehicles. A hub is fixed to a lower jig when a row of hub-side balls is disposed and an outer ring is disposed on an outer periphery of the hub and a row of inner ring-side balls and an inner ring are disposed. A press-fit jig is contacted to the inner ring and a load of less than 5 kgf is applied to an outer surface of the outer ring to prevent its vibration and movement. A gauge is installed to a portion of the outer ring. The inner ring is gradually press-fitted by the jig. An amount of press-fit of the inner ring is measured from when the gauge begins to move when press-fitting of the inner ring is completed. The amount of clearance is simply measured.

1 Claim, 8 Drawing Sheets

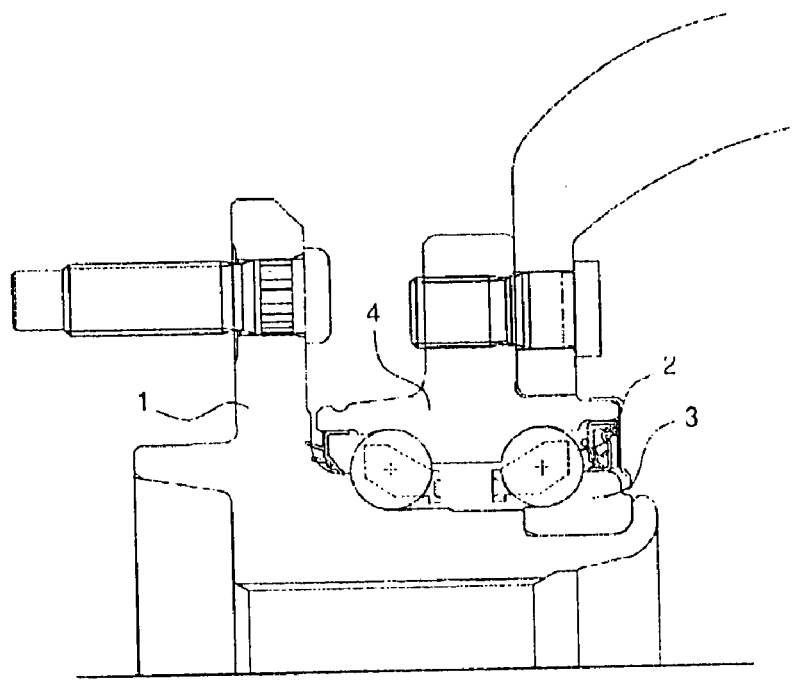
[Fig. 1] Prior Art
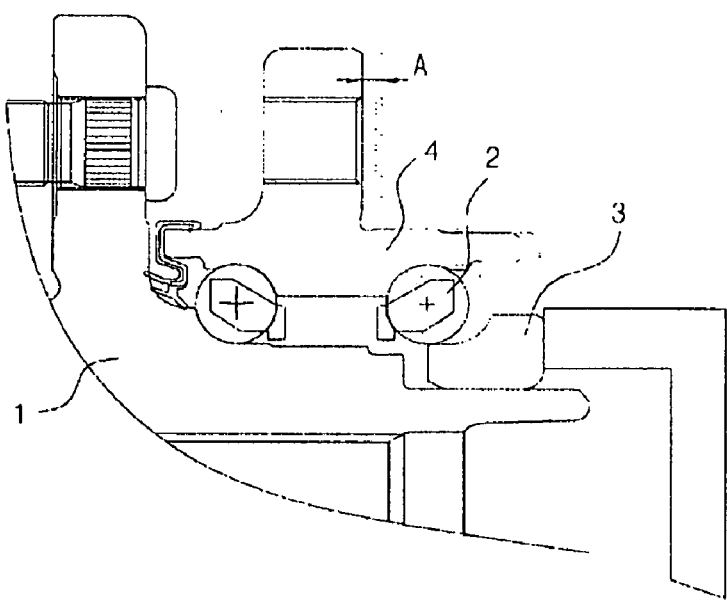
[Fig. 2] Prior Art

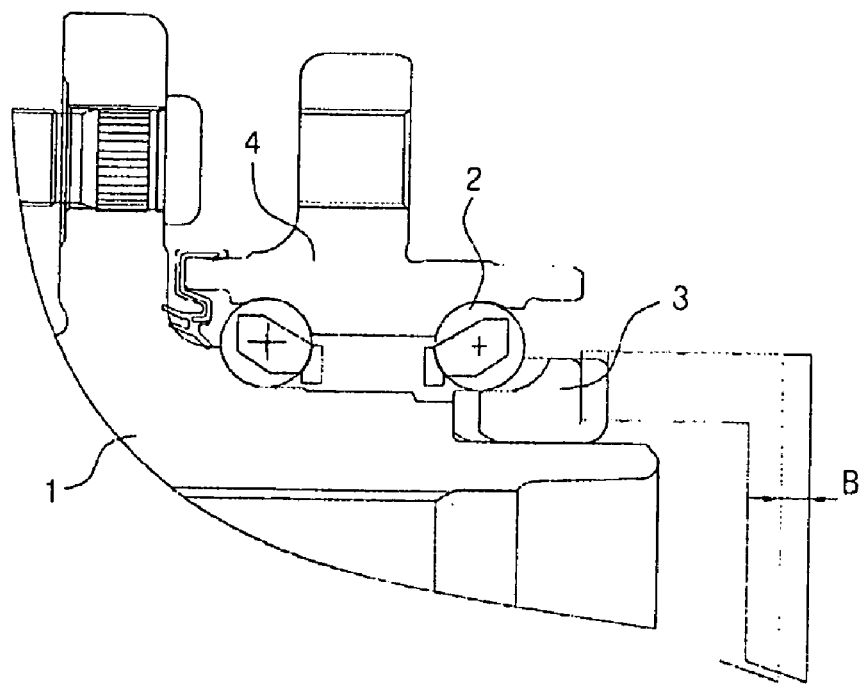
[Fig. 3] Prior Art

[Fig. 4] Prior Art
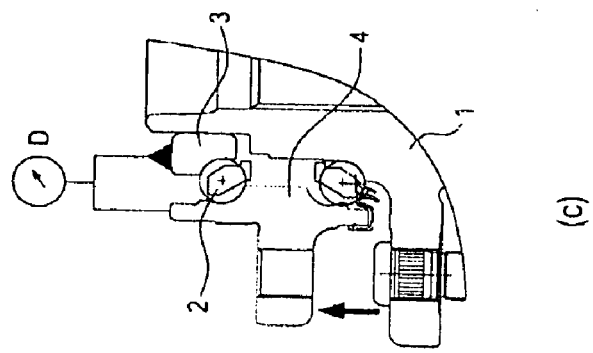
(c)
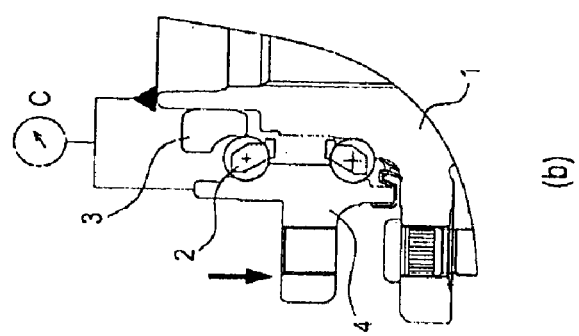
(b)
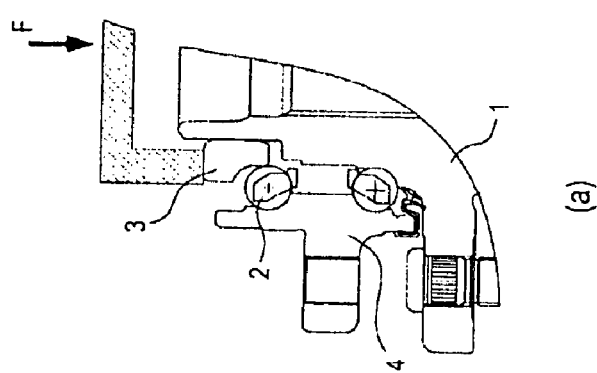
(a)

[Fig. 5] Prior Art
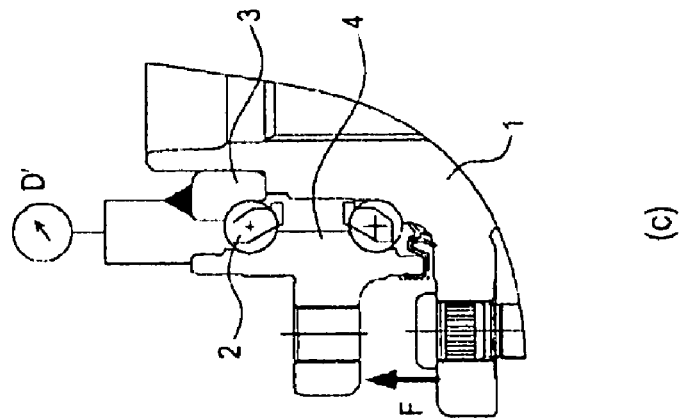
(c)
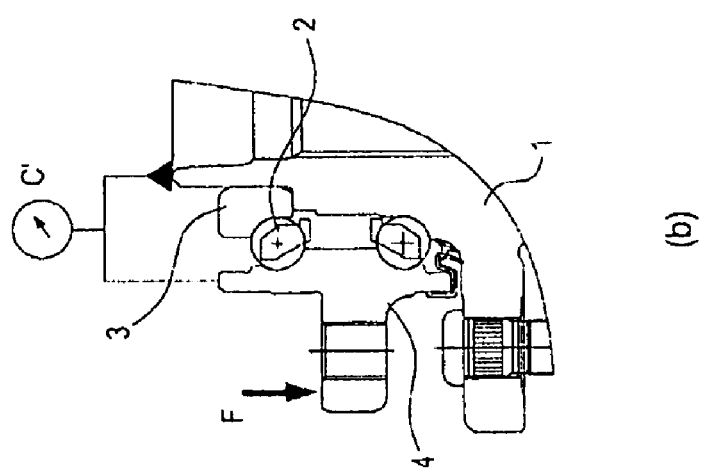
(b)
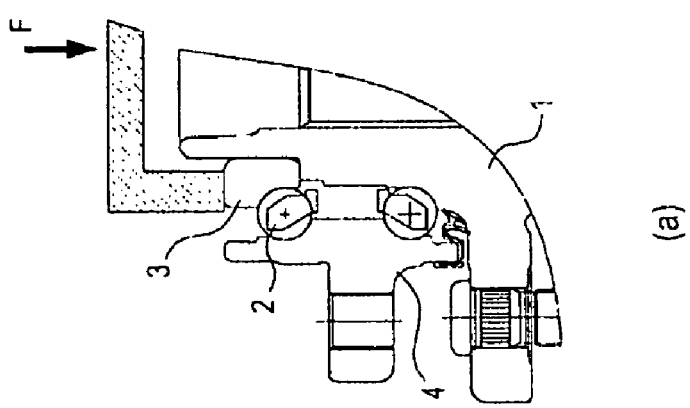
(a)

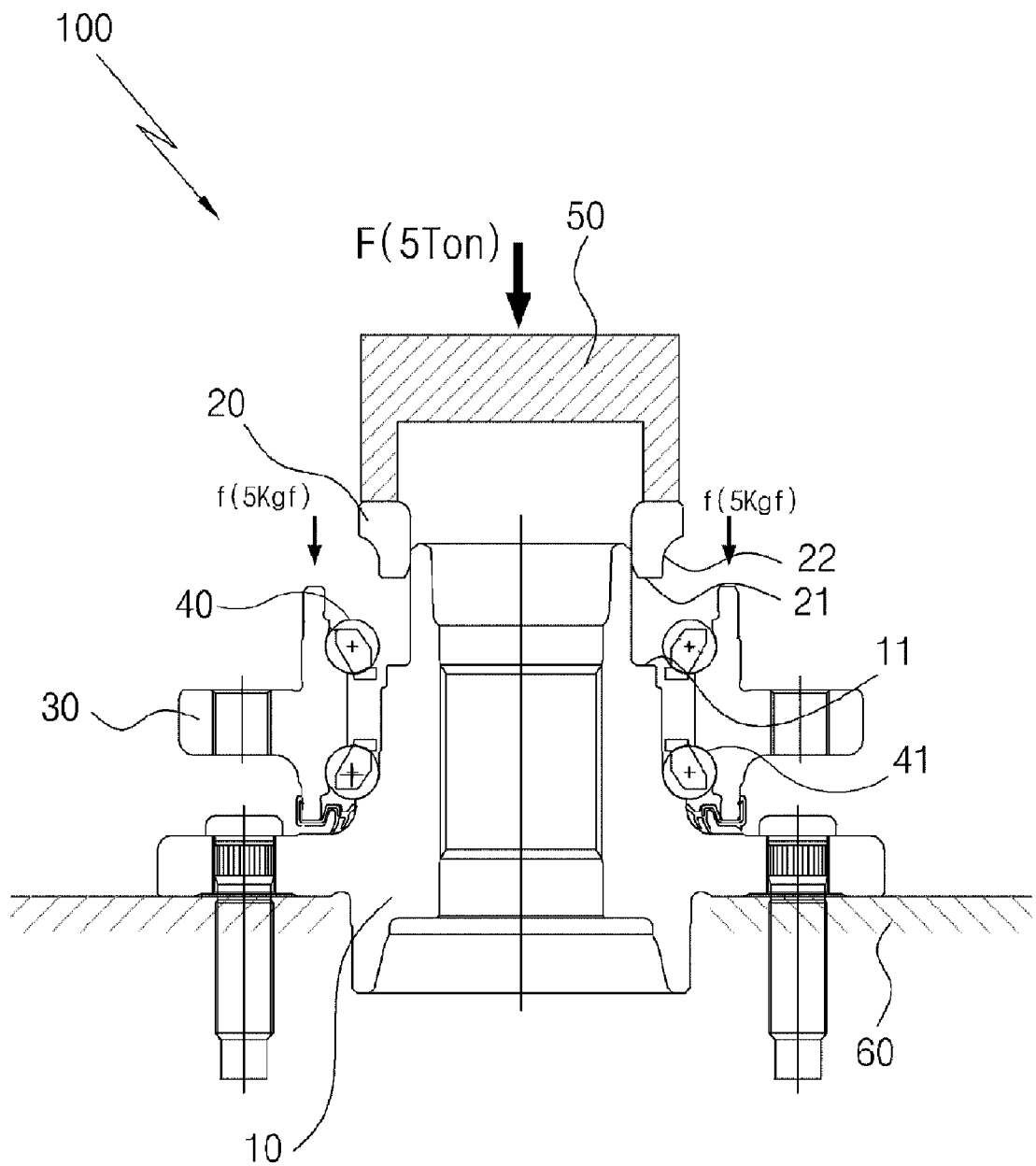
[Fig. 6]

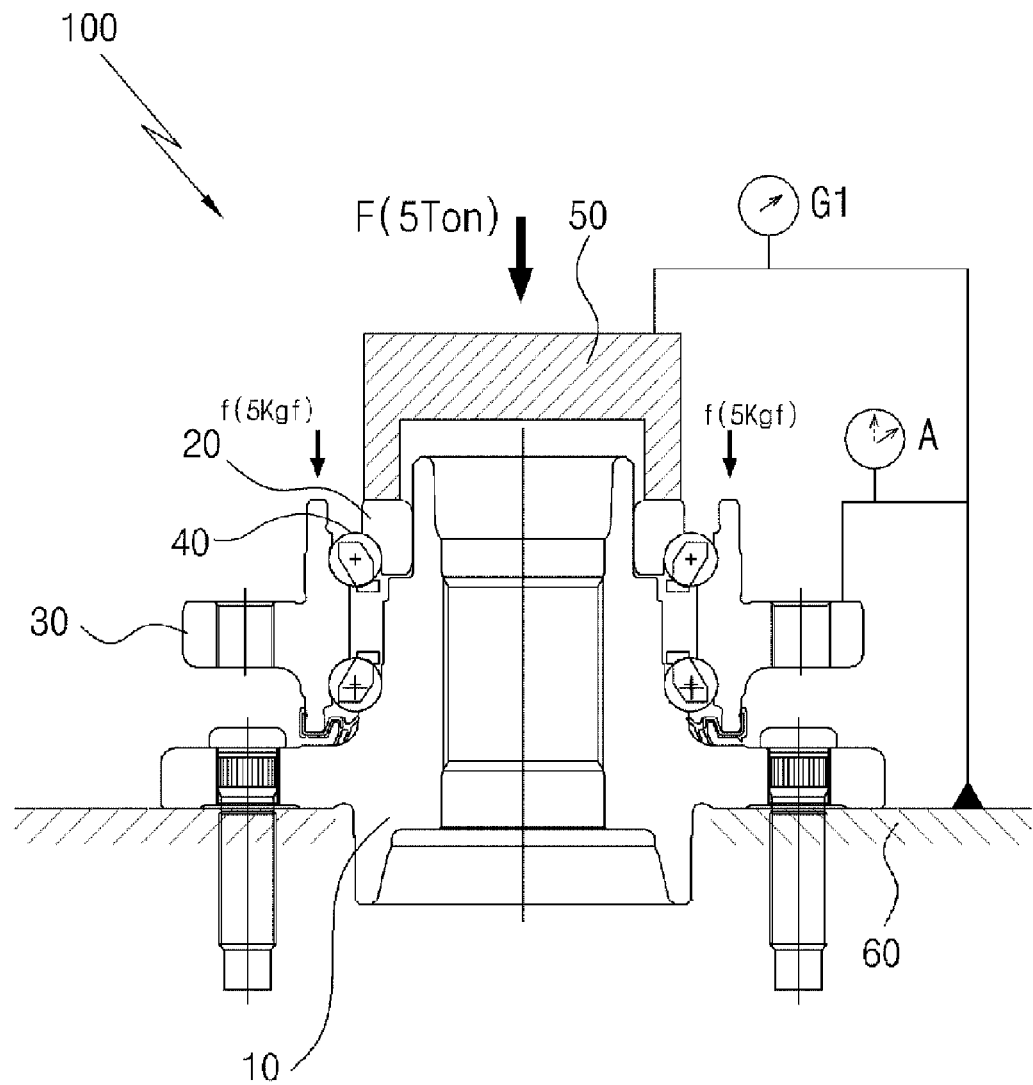

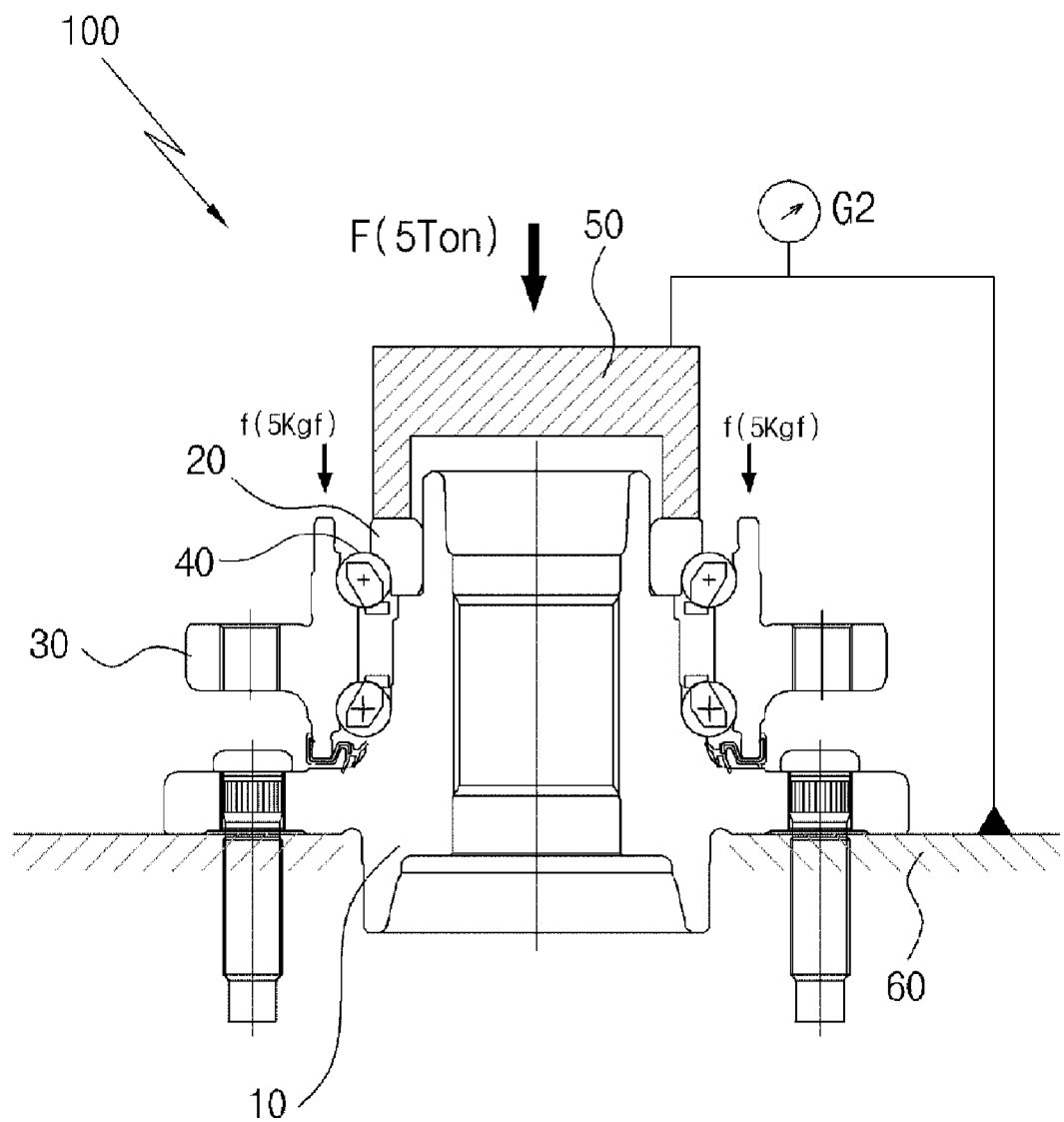
[Fig. 8]

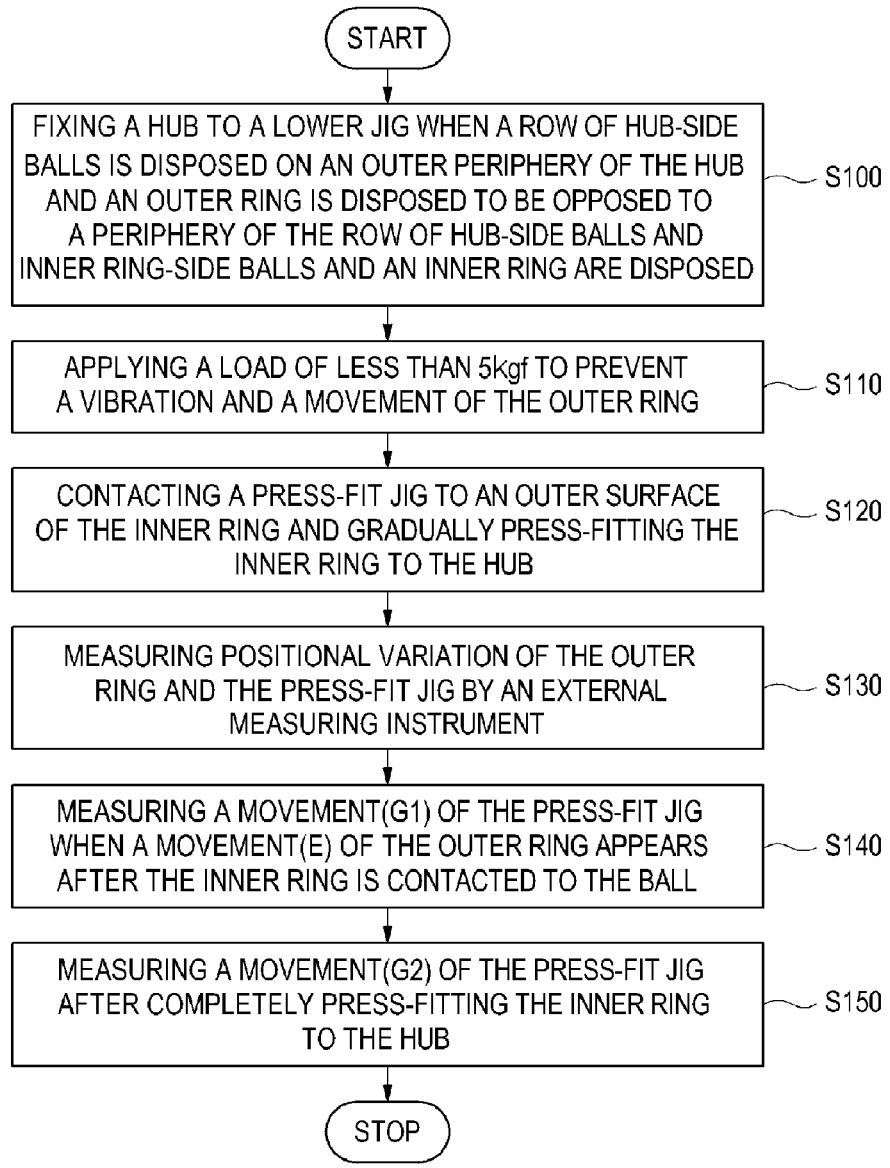
[Fig. 9]

METHOD OF MEASURING A CLEARANCE OF A HUB BEARING FOR VEHICLES

TECHNICAL FIELD

The present invention relates to a method of measuring a clearance of a hub bearing for vehicles, and more particularly to a method of measuring a clearance of a hub bearing for vehicles, wherein an amount of a clearance known to have a great influence on a bearing life can be simply measured compared to a prior art measuring method. Specifically, this is performed by fixing a hub in the state where a row of hub-side balls is disposed and an outer ring is disposed on an outer periphery of the hub and press-fitting an inner ring by means of a press-fit jig and measuring an amount of press-fitting the inner ring from when a gauge installed to a portion of the outer ring begins to move when press-fitting the inner ring is completed.

BACKGROUND ART

Generally, a hub bearing unit, which is mounted to an axle of the vehicle, supports a body of a vehicle. Since balls rotate in the hub bearing, the axle of the vehicle is allowed for smooth rotation. A clearance of the bearing has a great influence on the life of the bearing.

The hub bearing unit, which is used for an axle of a vehicle, is consisted of a hub 1, balls 2, an inner ring 3, an outer ring 4, a retainer, hub-bolts, etc., as shown in FIG. 1. A knuckle and the outer ring 4 are fastened to each other by bolts and the body of the vehicle is supported by the hub bearing. As shown in FIG. 1, a configuration of orbital forming an end portion of the hub 1 is generally used in the final assembly of the hub bearing unit so that an amount of a bearing pre-load is adjusted and a damage or disassembly of the hub bearing unit does not take place.

The amount of a clearance of the hub bearing, which is used for an axle of a vehicle, is intentionally adjusted by applying a pre-load when mounting the hub bearing to a drive axle, similar to conventional industrial bearings. As such, the bearing life is enhanced.

In order to enhance the bearing life, the amount of clearance is adjusted to negative. The amount of a clearance, which is applied to the hub bearing, is about −40~−50□, for example.

FIGS. 2 and 3 schematically show a prior art method of measuring a clearance of a hub bearing. Referring to FIGS. 2 and 3, a movement amount (A) of a flange of the outer ring 4 is first measured when the inner ring 3 is provisionally press-fitted to the hub 1. Thereafter, the inner ring 3 is completely press-fitted to the hub 1. Also, a movement amount (B) of a tool is measured at the time of complete press-fitting. The amount of clearance of the hub bearing, which is assembled in the above-described manner, can be represented as follows.

The amount of clearance of the hub bearing=A−B

FIGS. 4 and 5 show another prior art method of measuring a clearance of a hub bearing.

Referring to FIGS. 4 and 5, the inner ring 3 is provisionally press-fitted to the hub 1 as shown in FIG. 4(a). Also, a displacement (C) of the outer ring 4 relative to the hub 1 and a displacement (D) of the outer ring 4 relative to the inner ring 3 are measured respectively when a constant load is applied as shown in FIG. 4(b) and FIG. 4(c).

Thereafter, the inner ring 3 is completely press-fitted to the hub 1 by applying a load to the inner ring 3. After complete press-fitting of FIG. 5(a), a displacement (C') of the outer ring 4 relative to the hub 1 and a displacement (D') of the outer ring 4 relative to the inner ring 3 are measured once again when a constant load is applied as shown in FIG. 5(b) and FIG. 5(c).

The amount of clearance of such assembled hub bearing is (C−C')+(D−D').

Although the above-mentioned methods are different, their result values are the same.

There are problems with the above-mentioned two methods in that a measuring method is complicated and a measurement must be made many times. Further, a facility with an inner ring press-fitting process is required. Additionally, there is inconvenience with the above-mentioned methods in that zero point setting and compensation of a measuring device must be consecutively carried out in order to solve accumulated errors that occur due to repeated measurements.

DISCLOSURE OF INVENTION

Technical Problem

Therefore, it is an object of the present invention to provide a method of measuring a clearance of a hub bearing for vehicles when assembling the hub bearing. Specifically, an amount of clearance of a hub bearing can be measured simply in a single process to accomplish cost reduction. Further, the accumulated errors occurring due to many measurements are eliminated to enhance measurement reliability by measuring displacements of an outer ring and an end surface of an inner ring from a reference surface, while the inner ring is gradually press-fitted to a hub fixed to a lower jig.

Technical Solution

Consistent with the foregoing object and in accordance with the invention as embodied broadly herein, there is provided a method of measuring a clearance of a hub bearing for vehicles when assembling the hub bearing, comprising the following: fixing a hub to a lower jig when a row of balls is disposed on an outer periphery of the hub to be mounted to an axle and an outer ring is disposed on an outer periphery of the row of balls; applying a load to an outer surface of the outer ring so as to prevent a vibration and a movement of the outer ring; contacting a press-fit jig to an end surface of the inner ring and gradually press-fitting the inner ring to an outer periphery of the hub; measuring a positional variation of the outer ring and a positional variation of the end surface of the inner ring by an external measuring instrument; measuring a displacement (G1) of an end surface of the inner ring when a movement (E) of the outer ring appears and the movement is detected at a gauge (A) after the inner ring is brought into contact with the balls; and measuring a displacement (G2) of the end surface of the inner ring after completely press-fitting the inner ring to the hub.

BRIEF DESCRIPTION OF THE DRAWINGS

The above object and features of the present invention will become more apparent from the following description of the preferred embodiments given in conjunction with the accompanying drawings.

FIG. 1 is a schematic view showing a configuration of a conventional hub bearing.

FIGS. 2 and 3 are schematic views showing a prior art method of measuring a clearance of a hub bearing.

FIGS. 4 and 5 are schematic views showing another prior art method of measuring a clearance of a hub bearing.

FIGS. 6 to 8 are schematic views showing a method of measuring a clearance of a hub bearing according to the present invention.

FIG. 9 is a flow chart showing the method of measuring a clearance of a hub bearing according to the present invention.

BEST MODE FOR CARRYING OUT THE INVENTION

A method of measuring a clearance of a hub bearing for vehicles according to the present invention will now be described in detail with reference to accompanying drawings.

FIGS. 6 to 8 are schematic views showing a method of measuring a clearance of a hub bearing according to one embodiment of the present invention. FIG. 9 is a flow chart showing the method of measuring a clearance of a hub bearing according to the present invention As shown in the figure, according to the method of measuring a clearance of a hub bearing 100 during assembly, a hub 10 is fixed to a lower jig 60 after a row of hub-side balls 41 is disposed on a periphery of the hub 10, through which an axle passes. Further, an outer ring 30 is disposed to be opposed to an outer periphery of the row of hub-side balls 41 and a row of inner ring-side balls 40 and an inner ring are disposed. (S100)

In the outer ring 30, a race of the outer ring, the row of balls and a race of the hub cannot be precisely contacted to each other due to an elastic force of a seal lip of an open seal. To prevent movements caused by vibration that occur during press fitting of the inner ring, a load (B), the extent of which is determined so that an elastic deformation does not occur in the hub-side ball (e.g., 5 kgf), is applied to an end surface of the outer ring 30. Then, a gauge (A) is installed to a portion of the outer ring.

Next, the inner ring 20 is gradually press fitted to the hub 10 after a cylindrical press-fit jig 50 is brought into contact with an end surface of the inner ring 20. (S120) Also, a positional variation of the outer ring and a positional variation of the inner ring (e.g., a positional variation of the press-fit jig 50) are measured by an external measuring instrument. (S130)

In the above-described state, a contact surface 11 of the hub and a contact surface 21 of the inner ring are not brought into contact with each other. Further, a ball contacting surface 22 of the inner ring and the row of inner ring-side balls 40 are not brought into contact with each other.

If press-fitting of the inner ring continues, then the ball contacting surface 22 of the inner ring and the row of inner ring-side ball 40 are brought into contact with each other. Then, the press-fit force of the inner ring is transmitted to the outer ring via the balls, thereby causing the movement (E) of the outer ring 30. At this time, a displacement (G1) of the press-fit jig 50 (e.g., a displacement of the end surface of the inner ring) (G1) is measured. (S140)

Next, the inner ring 20 is press-fitted until the end surface of the inner ring 20 is brought into complete contact with the end surface of the hub 10. When press-fitting is completed, the race of the hub, two rows of the balls, a race of the inner ring and two races of the outer ring are brought into contact with each other and the hub bearing 100 has a negative clearance. However, in case no movement (E) of the outer ring is shown in a gauge (A) for measuring the end surface of the outer ring even when the end surface of the inner ring and the end surface of the hub are fully contacted to each other, such a hub bearing is determined to have a positive clearance resulting from faulty assembly and is selected separately.

A displacement (G2) of the end surface of the inner ring is measured when the end surface of the inner ring and the end surface of the hub are contacted to each other. (S150)

A load of about 5 tons (various according to sizes of bearings) is applied as a final press-fit force during press-fitting the inner ring. Such a load means that a force, which can be applied to the hub bearing when orbital forming, fastening nuts or assembling a constant velocity joint of the following process is carried out, is realized during press-fitting the inner ring. The present process for measuring the amount of clearance is carried out before orbital forming, fastening nuts or assembling a constant velocity joint. If the press-fit jig is removed from the end surface of the inner ring when the load of 5 tons is applied to the end surface of the inner ring, the components constituting the hub bearing spring back. Therefore, the position of the end surface of the inner ring becomes higher when compared to a case, which is finally press-fitted by the press-fit jig.

Measuring the displacement (G2) of the end surface of the inner ring is possible when applying the load of 5 tons or removing said load. However, the values of the measured amount of a clearance have different meanings. If the following process (e.g., orbital forming, fastening nuts, assembling a constant velocity joint) is completed, the amount of clearance is varied. The amount of clearance, which is obtained by measuring the displacement (G2) of the end surface of the inner ring when the load of 5 tons is applied, reflects the above-mentioned variation of the amount of clearance. On the contrary, the amount of clearance, which is obtained by measuring the displacement (G2) of the end surface of the inner ring when the load of 5 tons is removed, means the current assembly clearance of the hub bearing, which does not reflect the variation of the amount of clearance occurring in the following process.

The amount of clearance of the hub bearing 100, which is measured and calculated during the above-described assembly of the hub bearing, can be represented as the following numerical formula.

$$\text{The amount of clearance} = -[\text{the displacement } (G1) \text{ of the end surface of the inner ring} - \text{the displacement } (G2) \text{ of the end surface of the inner ring}] \quad [\text{Math FIG. 1}]$$

INDUSTRIAL APPLICABILITY

According to the method of measuring a clearance of a hub bearing for vehicles of the present invention, the amount of clearance can be measured simply and accurately during assembly process when compared to a prior art measuring method. Therefore, the process becomes very simple over a facility using the prior art measuring method and cost reduction is achieved with respect to manufacturing a facility. Further, the accumulated errors, which are generated due to many measurements in a prior art measuring method, are eliminated to thereby enhance measurement reliability.

The invention claimed is:

1. A method of measuring a clearance of a hub bearing for vehicles when assembling the hub bearing, comprising:

fixing a hub (10) to a frame (60) when an inner ring (20) is disposed on an outer periphery of the hub (10) to be mounted to an axle and an outer ring (30) is disposed to be opposed to an upper portion of the inner ring (20) and a row of balls (40) is disposed between the outer ring (30) and the inner ring (20) opposed thereto (S100);

applying a load to an outer surface of the outer ring (30) so as to prevent a vibration and a movement of the outer ring (30) (S110);

contacting a press-fit jig (50) to an outer surface of the inner ring (20) and gradually press-fitting the inner ring (20) to the hub (10) (S120);

measuring a positional variation of the outer ring (30) and a positional variation of the press-fit jig (50) by an external measuring instrument (S130);

measuring a displacement (G1) of an end surface (50) of the inner ring when a movement (E) of the outer ring (30) appears after the inner ring (20) is brought into contact with the row of balls (40) (S140); and measuring a displacement (G2) of the end surface (50) of the inner ring after completely press-fitting the inner ring (20) to the hub (10) (S150).

* * * * *